United States Patent
Mills

(10) Patent No.: US 11,535,388 B2
(45) Date of Patent: Dec. 27, 2022

(54) AIRCRAFT ENGINE ADAPTER SYSTEM

(71) Applicant: Aero Innovations LLC, Terre Haute, IN (US)

(72) Inventor: James M. Mills, Terre Haute, IN (US)

(73) Assignee: Aero Innovations, LLC, Terre Haute, IN (US)

( * ) Notice: Subject to any disclaimer, the term of this patent is extended or adjusted under 35 U.S.C. 154(b) by 142 days.

(21) Appl. No.: 16/846,877

(22) Filed: Apr. 13, 2020

(65) Prior Publication Data

US 2020/0324907 A1    Oct. 15, 2020

Related U.S. Application Data

(60) Provisional application No. 62/832,655, filed on Apr. 11, 2019.

(51) Int. Cl.
*B64D 27/26* (2006.01)
*B64D 27/02* (2006.01)
*B64F 5/10* (2017.01)

(52) U.S. Cl.
CPC ............. *B64D 27/26* (2013.01); *B64D 27/02* (2013.01); *B64F 5/10* (2017.01); *B64D 2027/262* (2013.01)

(58) Field of Classification Search
CPC .. B64D 27/26; B64D 2027/262; B64D 27/10; B64D 27/12; B64D 27/14
See application file for complete search history.

(56) References Cited

U.S. PATENT DOCUMENTS

| | | | |
|---|---|---|---|
| 3,020,004 A | 2/1962 | Blyth | |
| 3,360,222 A | 12/1967 | West, Jr. | |
| 4,531,694 A | 7/1985 | Soloy | |
| 10,144,526 B2 * | 12/2018 | Zameroski | ............. B64D 27/10 |
| 2002/0134887 A1 | 9/2002 | Lin et al. | |
| 2016/0280381 A1 | 9/2016 | Zameroski et al. | |

FOREIGN PATENT DOCUMENTS

WO    WO2017197232    11/2017

OTHER PUBLICATIONS

"Plane's Anatomy—Air Tractor AT-402" (Pivcic) Apr. 23, 2009 (Apr. 23, 2009) [online] retrieved from <URL: https://achtungskyhawk.com/2009/04/23/planes-anatomy-air-tractor-at-402/>.
"Air Tractor Radial Engine Mount" (Big Iron) Mar. 29, 2017 (Mar. 29, 2017) [online] retrieved from <URL: https://www.bigiron.com/Lots/AirTractorRadialEngineMount>.

* cited by examiner

*Primary Examiner* — Timothy D Collins
*Assistant Examiner* — Eric Acosta
(74) *Attorney, Agent, or Firm* — Pitts & Lake, P.C.

(57) ABSTRACT

An aircraft engine mounting system to retrofit an aircraft engine from one aircraft type to another in a manner suitable for approved flight. The system includes a circular member having longitudinal securement members extending therefrom to attach the circular member to an inner surface of the fuselage of an aircraft. The circular member in turn has mounting members configured to receive an aircraft engine to retrofit the engine from a first aircraft to a second aircraft.

8 Claims, 8 Drawing Sheets

AIRCRAFT ENGINE ADAPTER SYSTEM

CROSS-REFERENCE TO RELATED APPLICATIONS

This application claims the benefit of U.S. Provisional Application No. 62/832,655, filed on Apr. 11, 2019.

FIELD OF INVENTION

The present general inventive concept relates to an aircraft engine adapter system for retrofitting aircraft engines from one aircraft to another.

BACKGROUND

Example embodiments of the present general inventive concept can provide an engine mount adapter assembly for use with an aircraft. As shown in the accompanying illustrations, drawings, and images, the engine mount adapter assembly is attached to brackets, which are affixed to a skeletal framework comprising of multiple tubular members joined together. A ring member adapter can be attached to the brackets on the skeletal framework, and mounting brackets are attached to the ring member adapter. In this way, the engine mount adapter assembly can function as an adapter to retrofit aircraft engines with either three mount attachment points or four or more mount attachment points. Embodiments of the present general inventive concept can be applied to retrofit any and all PT-6 series engines (e.g., T34, T65, and others) to any S2R type airplanes, although the embodiments are not limited to any particular type of engine or airplane.

Additional features and embodiments of the present general inventive concept will be set forth in part in the description which follows, and, in part, will be obvious from the description, or may be learned by practice of the present general inventive concept.

BRIEF SUMMARY OF THE INVENTION

Example embodiments of the present general inventive concept can be achieved by providing a system for retrofitting an aircraft engine to an aircraft including a circular member having a diametrical surface to receive an aircraft engine of a first aircraft, a plurality of longitudinal members each having a first end and a second end, means for securely attaching the first ends in a circumferentially spaced apart manner to the diametrical surface such that the second ends extend transversely from the circular member in a first direction, means for securely attaching the second ends to an inner portion of a second aircraft, wherein shape and size of the inner portion of the second aircraft is different than shape and size of a corresponding inner portion of the first aircraft, means for securely attaching a rear end of the aircraft engine to the diametrical surface such that a front end of the aircraft engine extends transversely from the diametrical surface opposite the first direction such that the aircraft engine of the first aircraft is securely mounted to the second aircraft suitable for approved flight.

The system can include means for retrofitting electrical, control, and fuel line connections of the second aircraft to mate the aircraft engine of the first aircraft.

Example embodiments of the present general inventive concept can also be achieved by providing an engine adapter for an aircraft, which adapts to a skeletal framework configured to support an aircraft engine of a first aircraft, one or more rear stiffeners attached to a rear end of the skeletal framework, one or more forward stiffeners attached to the front end of the skeletal framework, wherein the skeletal framework is configured for installation to a second aircraft to retrofit the engine of the first aircraft to the second aircraft, and the skeletal framework comprises multiple tubular members joined to the forward stiffeners at the front end of the skeletal framework and joined to the rear stiffeners at the rear end of the skeletal framework, and wherein the forward stiffeners attach to a ring member at the front end of the skeletal framework.

Further embodiments can provide methods of adapting an engine to an aircraft, comprising providing a skeletal framework including multiple tubular members configured to support an aircraft engine of a first aircraft, providing one or more rear stiffeners attached to a rear end of the skeletal framework, providing one or more forward stiffeners attached to the front end of the skeletal framework and to the fuselage of the aircraft, and wherein the skeletal framework is configured for installation to a second aircraft to retrofit the engine of the first aircraft to the second.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Figure 1:
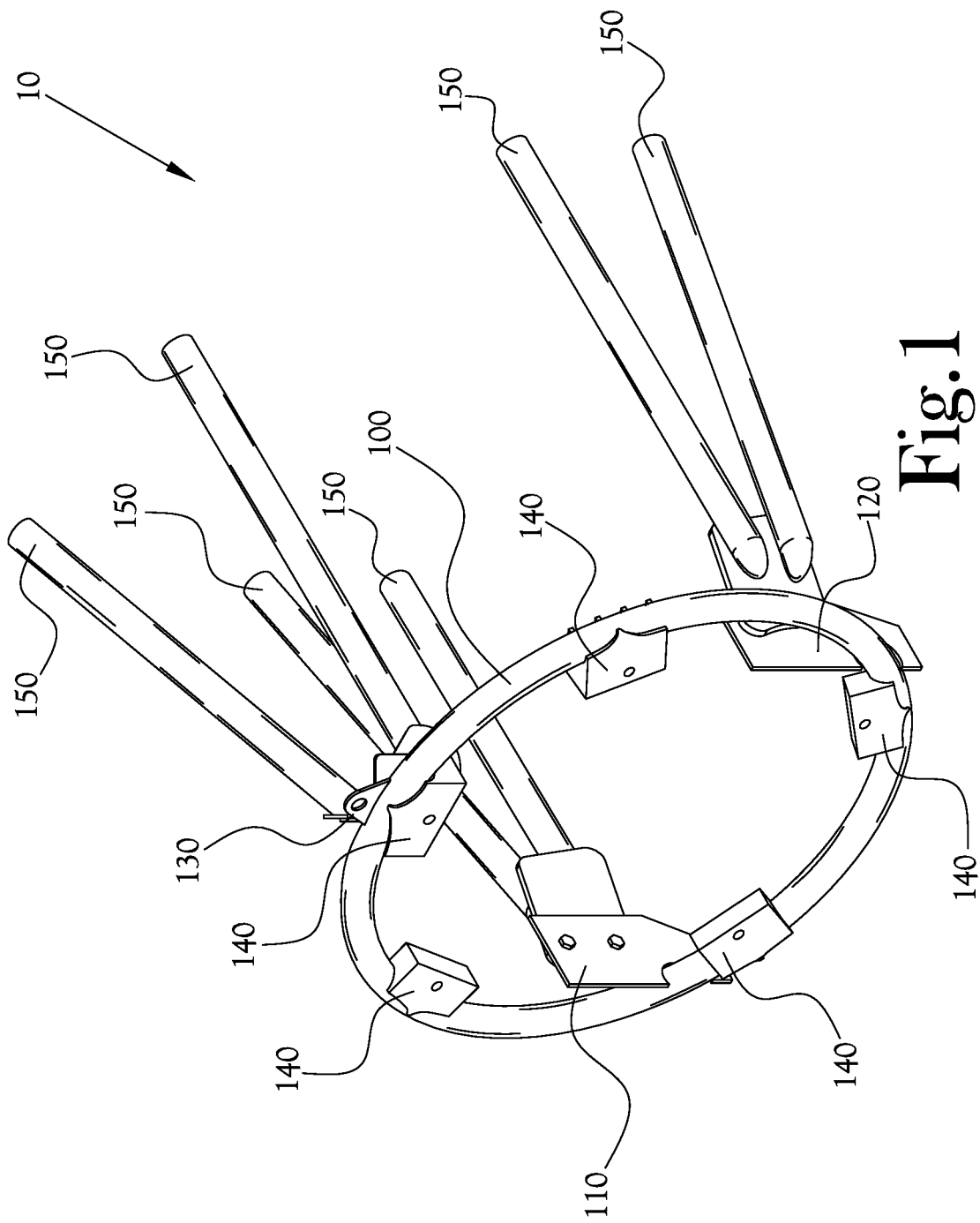
FIG. 1 illustrates a perspective view of an engine mount adapter assembly according to example embodiments of the present general inventive concept.

Reference will now be made to the example embodiments of the present general inventive concept, examples of which are illustrated in the accompanying drawing(s) and illustration(s). The example embodiments are described herein in order to explain the present general inventive concept by referring to the figure(s). The following detailed description is provided to assist the reader in gaining a comprehensive understanding of the structures described herein. Accordingly, various changes, modification, and equivalents of the structures and techniques described herein will be suggested to those of ordinary skill in the art. The descriptions are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to some embodiments of the present inventive concept, an engine mount adapter assembly is provided which can be used to retrofit a replacement engine to an airplane. For example, the Model S2R-H80-Thrush Aircraft can be retrofit with a various Pratt & Whitney PT6A turboprop engines using the engine mount adapter assembly. Embodiments of the present general inventive concept can be applied to retrofit any and all PT-6 series engines (e.g., T34, T65, and others) to any S2R type airplanes, although the embodiments are not limited to any particular type of engine or airplane.

Example configurations of the retrofitting system can be achieved by configuring the adaptor ring in size and shape to enable the altering the tubular structure of the engine mount of the newly transferred engine; transferring the propeller control linkage; transferring lord engine isolator mounts; transferring cowling basket; transferring cowl panels; recalibrating glass panel engine monitoring and annunciation systems; reconfiguring sensor system harnesses, transmitters, and connectors; removing emergency fuel pump, circuit breaker, switch, and placard; and isolating and securing wiring and connectors. Starting and generation systems transferred with engine and previous systems removed. Wiring and remaining wiring blanked off and isolated.

FIG. 1 illustrates an example system configured in accordance with embodiments of the present general inventive concept. An engine mount adapter assembly 10 according to example embodiments of the present general inventive concept. A main support device shown as a ring or circular member 100 in the figure includes a diametrical surface to support an aircraft engine in a secure manner as well as provide a mounting surface for various attachment and securement means for various forward and rear mounting stiffeners comprising brackets, and other parts of the aircraft including fuel lines, electronics, control systems, among other devices. Shown attached to the ring member 100 are various securement means which may include a left bracket assembly 110 and a right bracket assembly 120. These bracket assemblies 110 and 120 are configured to support the aircraft engine and provide a secure fitment, preventing excessive movement and vibration during use. Equivalent means may be provided to attach the components shown in manners known in the art, such as welding, bolting, fixturing, etc.

Also shown in the figure is means for attaching an aircraft engine including a top bracket assembly 130. The top bracket assembly 130 also provides an attachment point for the aircraft engine, although its configuration as shown in the figure is different from the left bracket assembly 110 and right bracket assembly 120. Shown connected to the bracket assemblies 110, 120, and 130 are multiple longitudinal, e.g., tubular members 150 which may join together to form a skeletal support structure. A plurality of mounting brackets 140 may function as means for supporting the aircraft engine to the ring member independent of the means for attaching the longitudinal members 150. The mounting bracket 140 may include fingers, as shown in the figure, which are configured to grip the ring member 100 and support the aircraft engine. The multiple longitudinal or tubular members 150 may join onto an inner surface of the fuselage of the aircraft at a rear end of the skeletal support structure by welding the distal ends of the tubular members 150 using suitable attachment means known in the art. One of ordinary skill in the art will recognize that the invention is not limited to the specific orientations and configurations illustrated in FIG. 1, and any number of equivalent configurations may also be possible using sound engineering judgement as known in the art, including various flanges, brackets, welds, bolts, plates, fixtures, etc.

Figure 2:
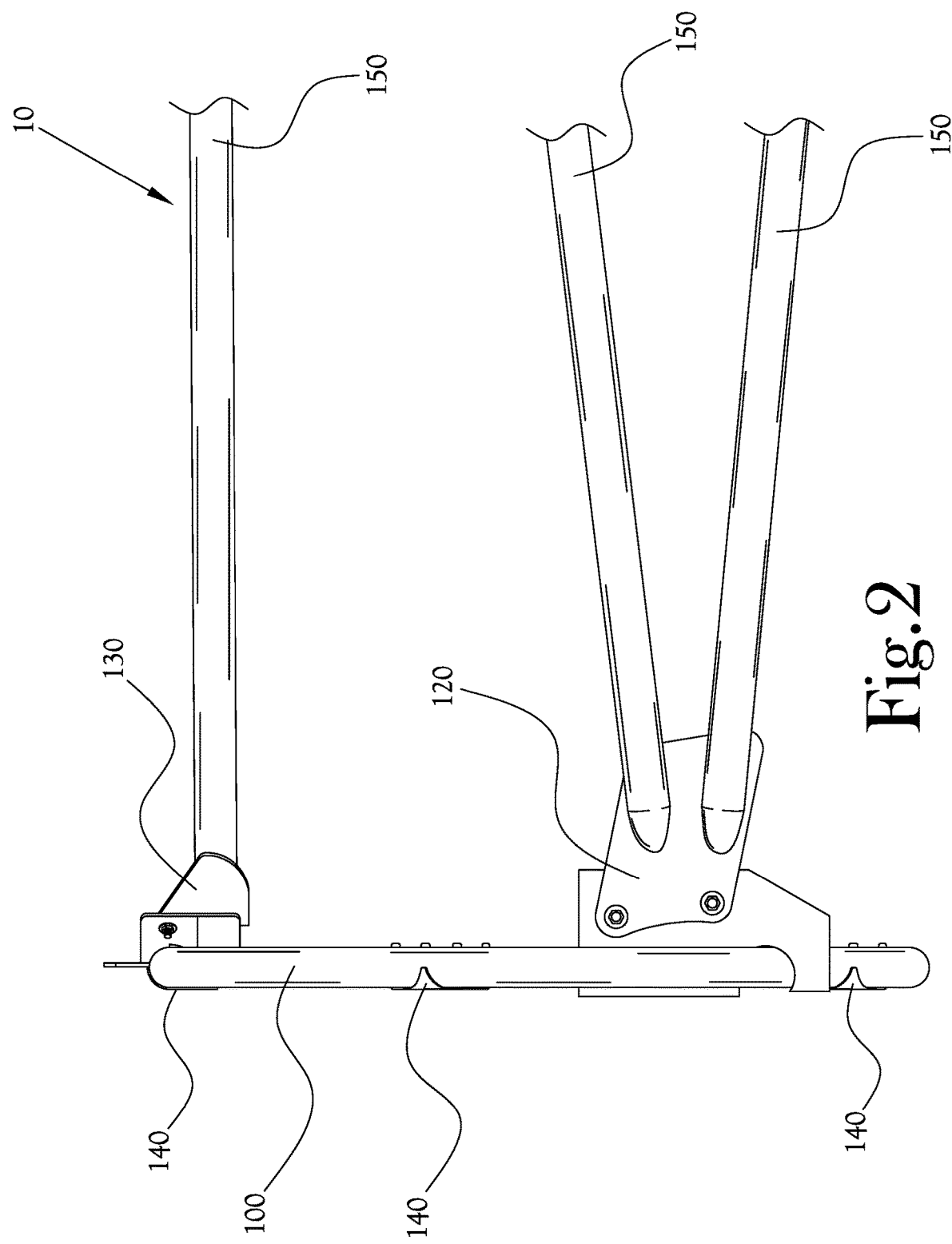
FIG. 2 illustrates a side view of the engine mount adapter assembly according to example embodiments of the present general inventive concept.

FIG. 2 illustrates a side view of the engine mount adapter assembly 10 according to example embodiments of the present general inventive concept. A main support device shown as a ring member 100 in the figure may enclose an aircraft engine in a supporting manner as well as provide attachment points for various brackets. Only the right bracket assembly 120 is visible in this view and is shown attached to tubular members 150 which may join together to form a skeletal support structure. A single mounting bracket 140 may also be attached to the ring member 100.

Figure 3:
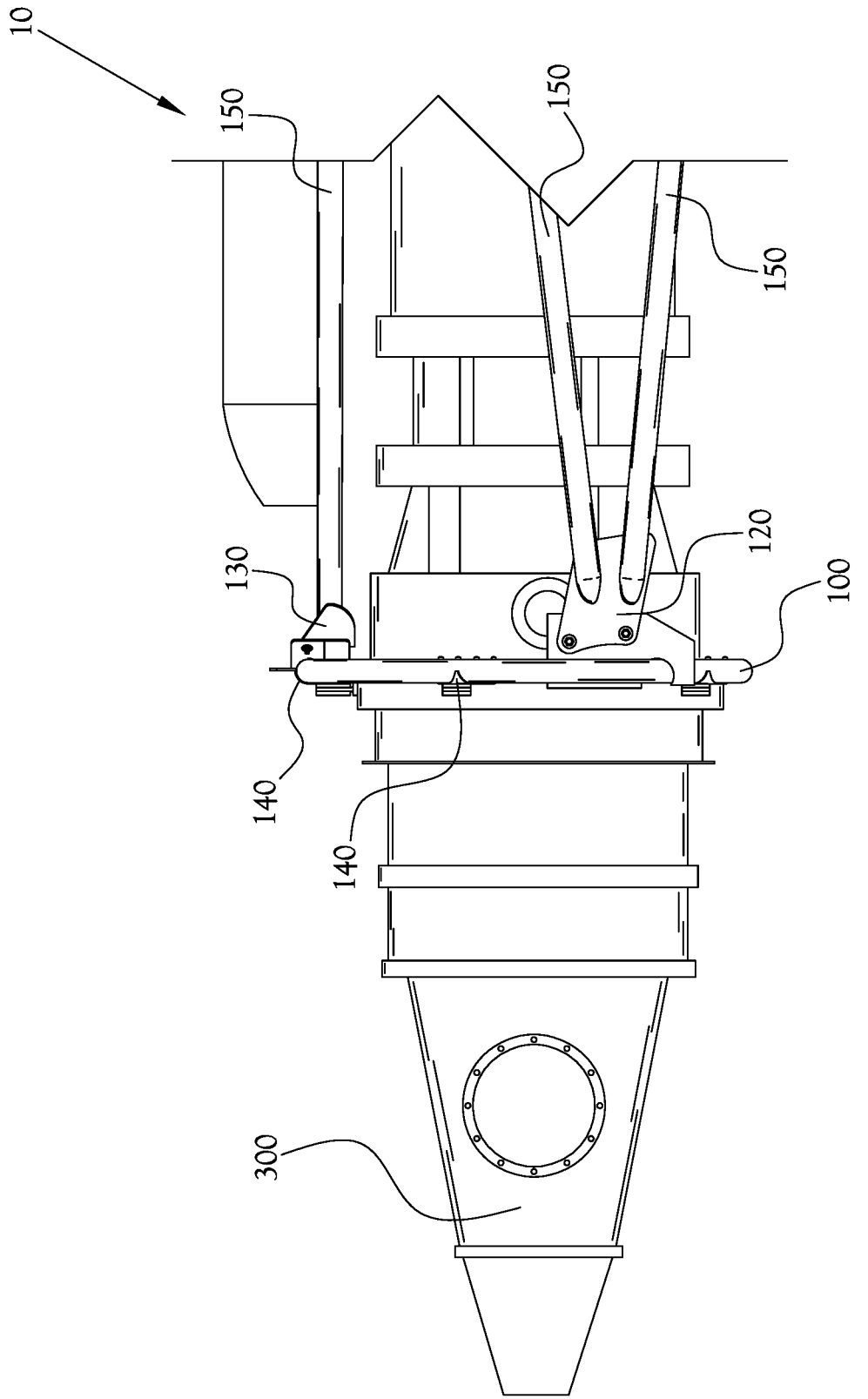
FIG. 3 illustrates a side view of the engine mount adapter assembly with engine according to example embodiments of the present general inventive concept.

Shown in FIG. 3 is a side view of the engine mount adapter assembly 10 with engine 300 attached according to example embodiments of the present general inventive concept. A main support device shown as a ring member 100 in the figure enclosing an aircraft engine in a supporting manner as well as provide attachment points for various brackets. Only the right bracket assembly 120 is visible in this view and is shown attached to tubular members 150 which may join together to form a skeletal support structure. A single mounting bracket 140 may also be attached to the ring member 100 and serves in the embodiment as an attachment point to the aircraft engine 300.

Figure 4:
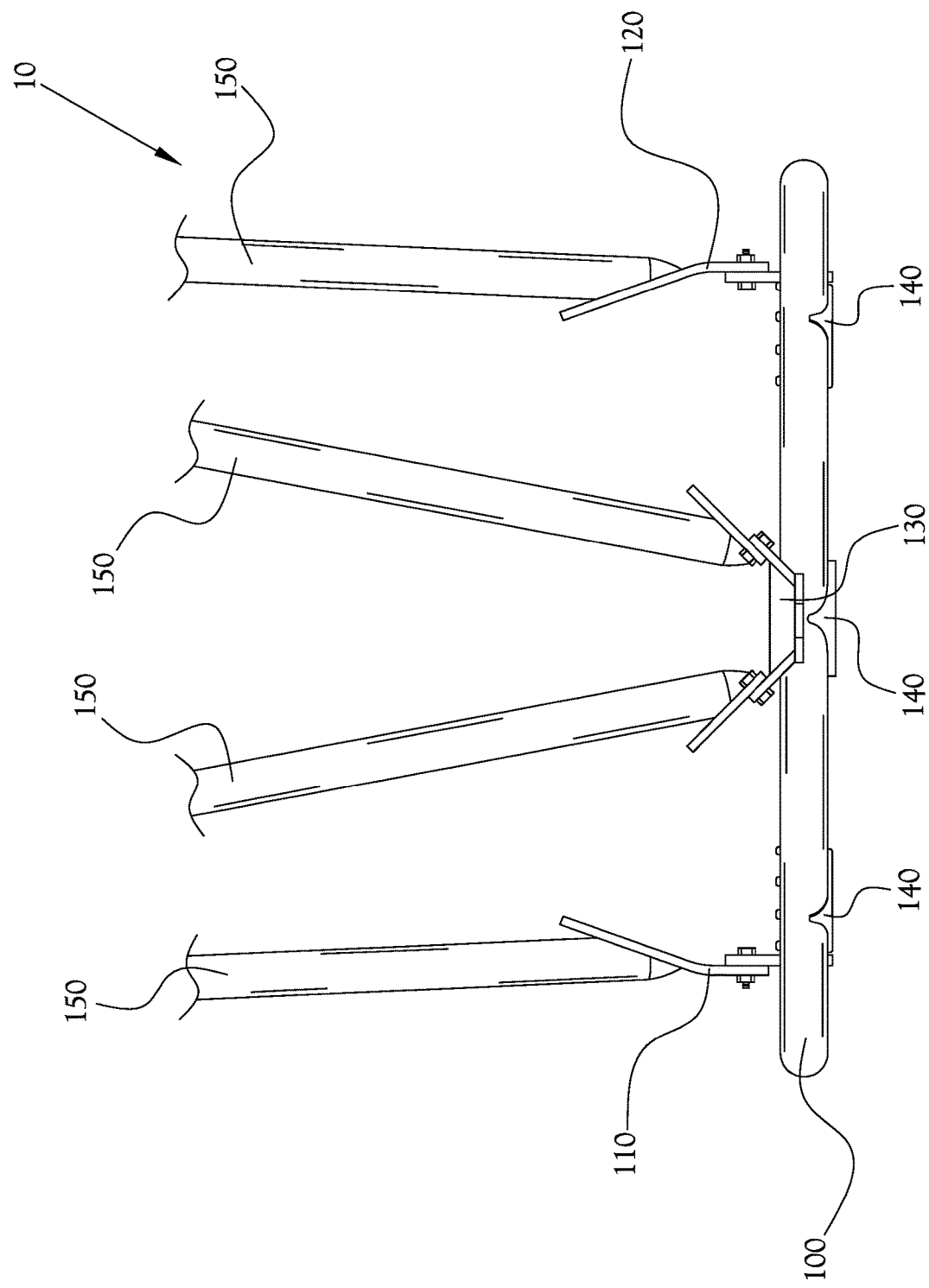
FIG. 4 illustrates a top view of the engine mount adapter assembly showing a ring member with multiple mount brackets attached to the ring member according to example embodiments of the present general inventive concept.

FIG. 4 illustrates a top view of the engine mount adapter assembly 10 according to example embodiments of the present general inventive concept. A main support device shown as a ring member 100 in the figure may enclose an aircraft engine in a supporting manner as well as provide attachment points for various brackets. Both the left bracket assembly 110 and right bracket assembly 120 are visible in this view and are shown attached to tubular members 150 which may join together to form a skeletal support structure.

Figure 5:
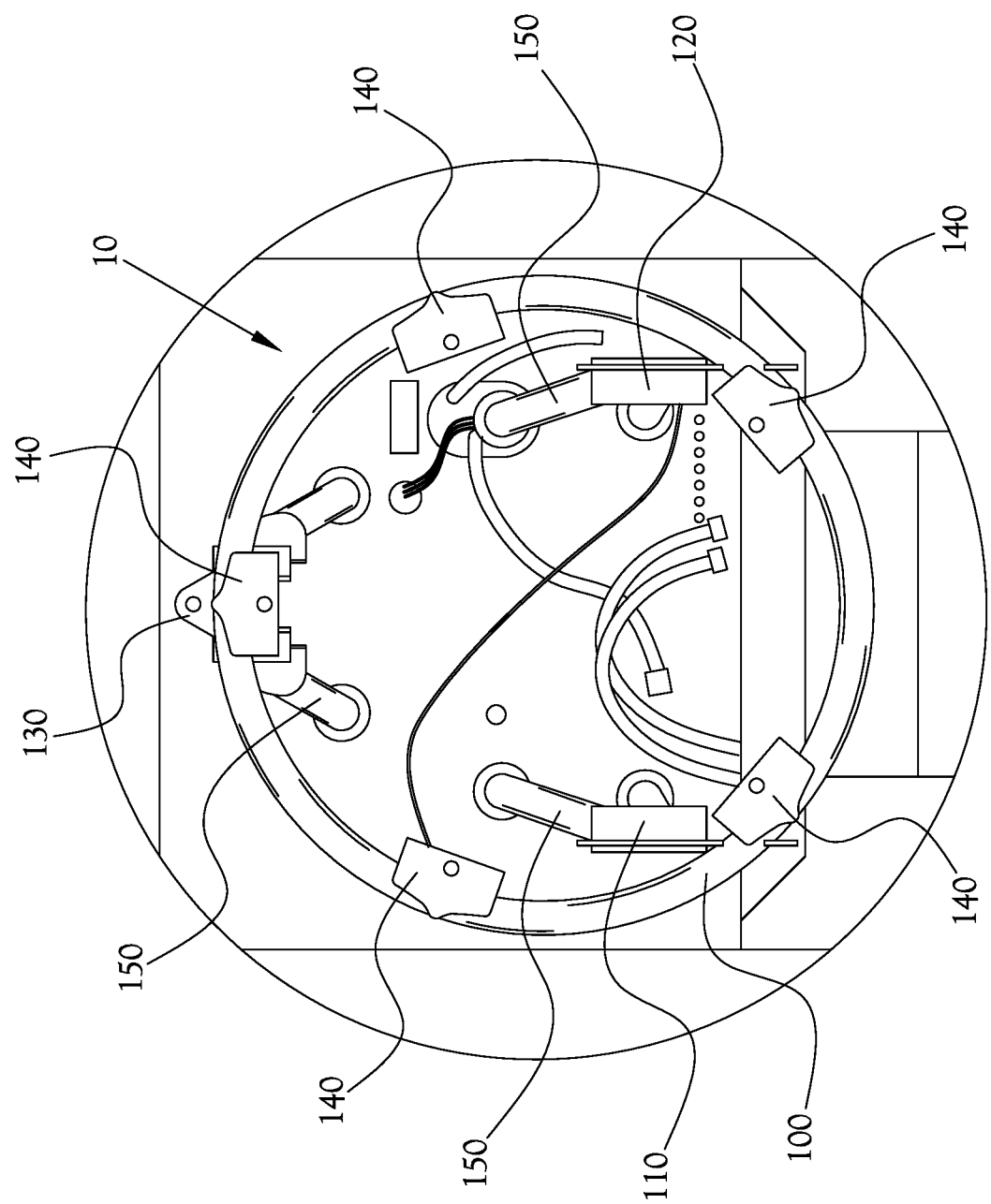
FIG. 5 illustrates a straight on view of the engine mount adapter assembly showing the engine mount adapter assembly attached to the engine of an aircraft according to example embodiments of the present general inventive concept.

FIG. 5 illustrates a straight on view of the engine mount adapter assembly 10 showing the engine mount adapter assembly attached to the engine of an aircraft according to example embodiments of the present general inventive concept. A main support device shown as a ring member 100 in the figure may enclose an aircraft engine in a supporting manner as well as provide attachment points for various brackets and other parts of the aircraft including fuel lines, electronics, control systems, among other devices. Shown attached to the ring member 100 FIG. 1 is a left bracket assembly 110 and a right bracket assembly 120. These bracket assemblies 110 and 120 support the aircraft engine and provide a secure fitment, preventing excessive movement and vibration during use. Also shown is a top bracket assembly 130. The top bracket assembly 130 also provides an attachment point for the aircraft engine, although its configuration as shown in the figure is different from the left bracket assembly 110 and right bracket assembly 120. Shown connected to the bracket assemblies 110, 120, and 130 are multiple tubular members 150 which may join together to form a skeletal support structure. A single mounting bracket 140 may function to support the aircraft engine without attachment to the tubular members 150 and skeletal support structure. Also shown in the figure are various other aircraft components including the fuel lines, electronics, control systems, as mentioned above. The engine mount adapter assembly 10 may serve to support and stabilize the various other aircraft components.

Figure 6B:
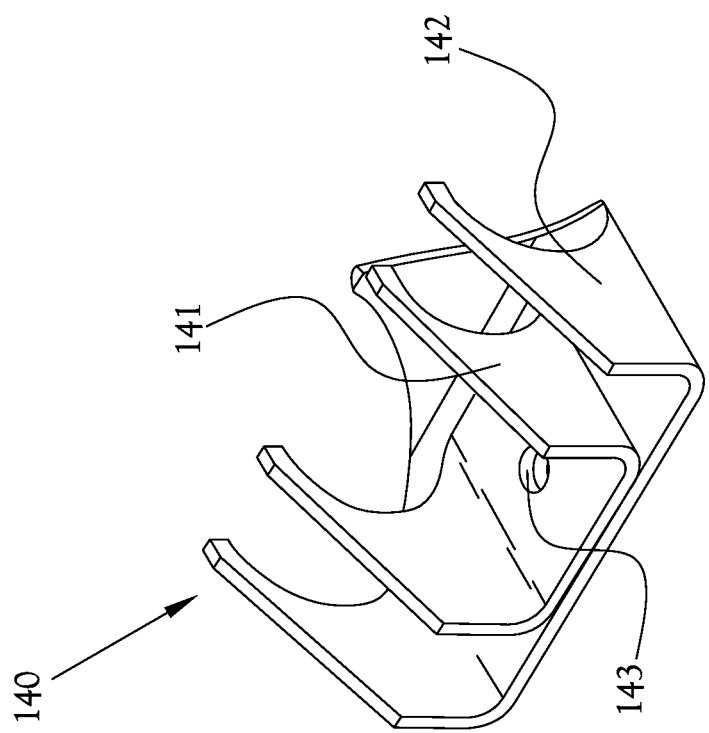
FIG. 6B illustrates a perspective view of a pair of support brackets according to example embodiments of the present general inventive concept.
Figure 6A:
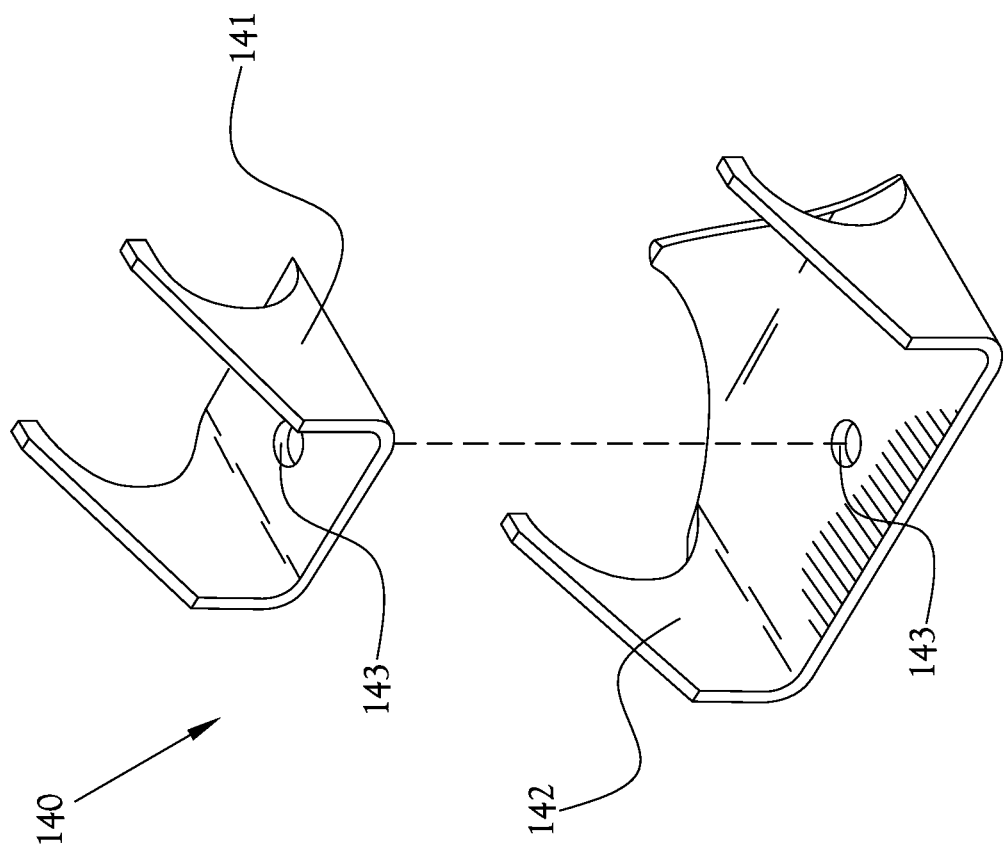
FIG. 6A illustrates a perspective view of a pair of support brackets integrally formed according to example embodiments of the present general inventive concept.

FIG. 6A illustrates a perspective view of a pair of support brackets according to example embodiments of the present general inventive concept. In the figure, a smaller support bracket 141 is shown with a larger support bracket 142 with a central attachment point 143 illustrated as a hole in the center of each support bracket. By attaching the smaller support bracket 141 with the larger support bracket 142 at the central attachment point 143 a more structural secure and rigid bracket may be realized, which can be used to support the weight of an aircraft engine. FIG. 6A illustrates a perspective view of the pair of support brackets integrally formed into the single mounting bracket 140, according to example embodiments of the present general inventive concept. In one embodiment, the smaller support bracket 141 and larger support bracket 142 may be welded together, such as by TIG welding, although other attachment means and devices, known in the art, may be used.

Figure 7:
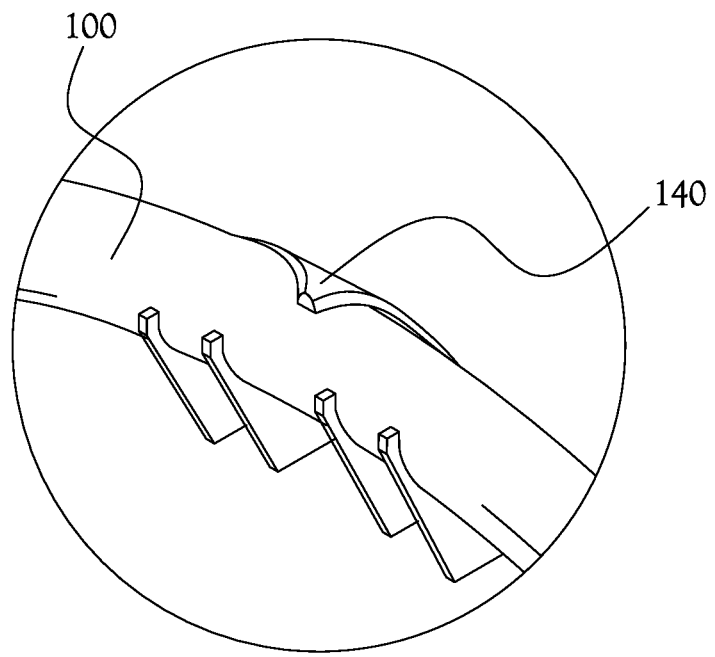
FIG. 7 illustrates a close up view of a pair of support brackets supporting a ring member according to example embodiments of the present general inventive concept.

FIG. 7 illustrates a close up view of a single mounting bracket 140 supporting a ring member 100 according to example embodiments of the present general inventive concept.

Figure 8:
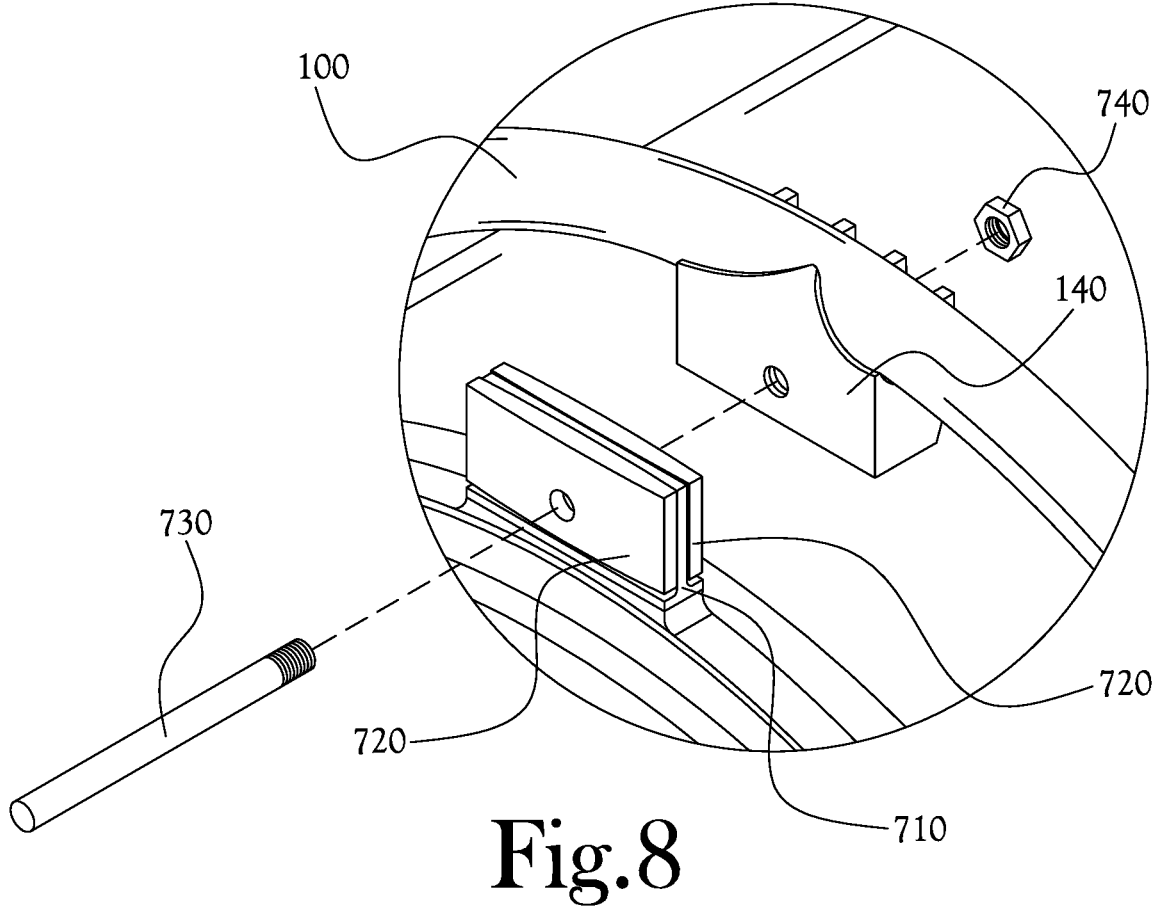
FIG. 8 illustrates a close up view of a pair of support brackets attaching to the engine of an aircraft according to example embodiments of the present general inventive concept.

FIG. 8 illustrates a close up view of a single mounting bracket 140 attaching to the engine of an aircraft according to example embodiments of the present general inventive concept. A T-square brace 710 integral to the aircraft engine and circumferentially spaced on the engine for mounting purposes is shown between two boots 720. The boots 720 may be made of rubber, plastic, or other materials which may have vibration and sound dampening properties. The T-square brace 710 and boot 720 assembly may be attached to the single mounting bracket 140 at the central attachment point 143 and joined together by a nut 740 and bolt 730 attachment assembly or other attachment means known in the art.

Figure 9B:
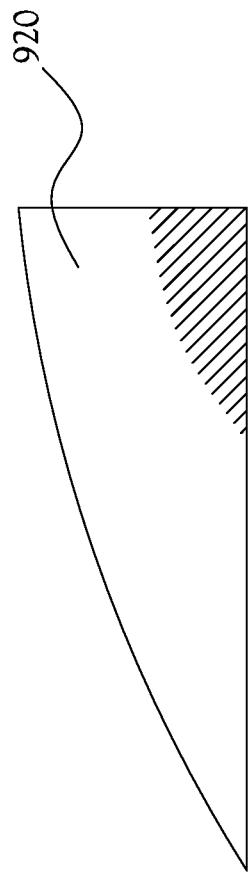
FIG. 9b illustrates a view of a support bracket according to example embodiments of the present general inventive concept.
Figure 9D:
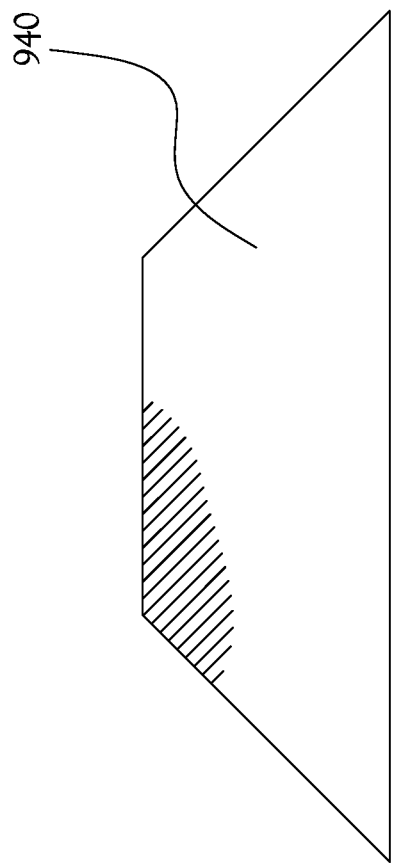
FIG. 9d illustrates a view of a support bracket according to example embodiments of the present general inventive concept.
Figure 9A:
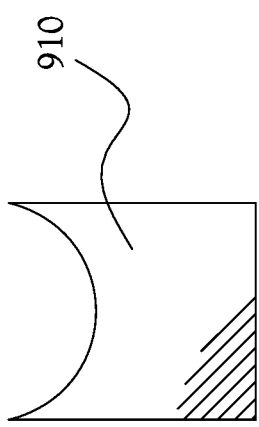
FIG. 9a illustrates a view of a support bracket according to example embodiments of the present general inventive concept.
Figure 9C:
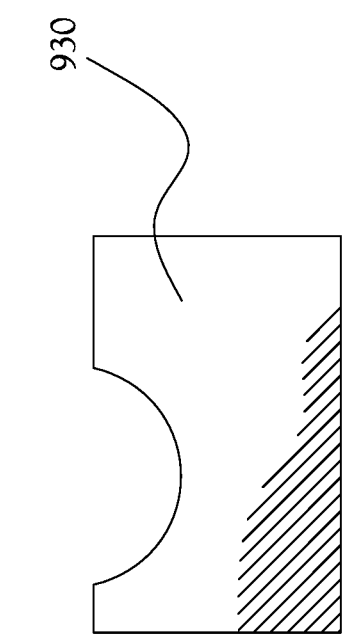
FIG. 9c illustrates a view of a support bracket according to example embodiments of the present general inventive concept.

Illustrated in FIGS. 9a-9c are various support brackets which may be used as part of the engine mount adapter assembly 10. FIG. 9a illustrates a view of a support bracket 910 with a semicircular groove mateable with the circular cross section of the ring member 100. FIG. 9b illustrates a view of a support bracket 920 which a semicircular shape mateable with part of the circumference of the ring member 100. FIG. 9c illustrates a view of a support bracket 930 with a semicircular groove mateable with the circular cross section of the ring member 100. FIG. 9d illustrates a view of a support bracket 940 which may be in the shape of a trapezoid. The support bracket 940 may be attached at one end to the ring member 100 and to the tubular members 150 at the other. Additionally, the support bracket 940 may be used to attach the tubular members 150 to the fuselage of the aircraft at the rear end of the skeletal support structure. Moreover, the embodiments are not limited to those brackets shown in FIGS. 9a-9c and may utilize other bracket shapes and designs to attach the tubular members 150 to the front end of the engine mount adapter assembly 10 and the rear end, towards the aircraft fuselage.

As illustrated and describe herein, example embodiments of the present general inventive concept can be achieved by providing a system for retrofitting an aircraft engine to an aircraft including a circular member having a diametrical surface to receive an aircraft engine of a first aircraft, a plurality of longitudinal members each having a first end and a second end, means for securely attaching the first ends in a circumferentially spaced apart manner to the diametrical surface such that the second ends extend transversely from the circular member in a first direction, means for securely attaching the second ends to an inner portion of a second aircraft, wherein shape and size of the inner portion of the second aircraft is different than shape and size of a corresponding inner portion of the first aircraft, means for securely attaching a rear end of the aircraft engine to the diametrical surface such that a front end of the aircraft engine extends transversely from the diametrical surface opposite the first direction such that the aircraft engine of the first aircraft is securely mounted to the second aircraft suitable for approved flight.

The system can include means for retrofitting electrical, control, and fuel line connections of the second aircraft to mate the aircraft engine of the first aircraft.

One of ordinary skill in the art would appreciate that the reference only dimensions and features shown are not intended to be limiting, but are given as examples to describe some, but not all, possible embodiments of the present inventive concept. Various additional dimensions, components and features could be chosen using sound engineering judgement to achieve the same or similar results. Such devices can provide an adapter to install (or retrofit) in an aircraft an engine that was not originally provided during manufacture, thus effectively eliminating the need to provide a costly custom fit for each such aircraft. Such a device/system increases efficiency while also lowering cost.

While there have been described what are considered to be preferred embodiments of the present invention, it will be readily appreciated by those skilled in the art that modifications can be made without departing from the scope of the teachings herein. Numerous variations, modification, and additional embodiments are possible, and, accordingly, all such variations, modifications, and embodiments are to be regarded as being within the spirit and scope of the present general inventive concept.

The present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. In an aircraft having an engine of a first type and wherein said aircraft is not adapted for an engine of a second type, said engine of said second type having at least one integral T-square brace defining a mounting point, a retrofit adapter for retrofitting said engine of said second type into said aircraft, said retrofit adapter comprising:
   a skeletal framework having a front end and a rear end, said skeletal framework being configured to support said engine of said second type;
   a ring member at the front end of the skeletal framework;
   one or more rear stiffeners attached to the rear end of the skeletal framework;
   one or more forward stiffeners attached to the ring member provided at the front end of the skeletal framework;
   said skeletal framework including a plurality of tubular members joined to the forward stiffeners at the front end of the skeletal framework and joined to the rear stiffeners at the rear end of the skeletal framework;
   at least one mounting bracket for attaching the tubular members to the ring member at the front end of the skeletal framework, wherein said at least one mounting bracket is configured to grip the ring member, wherein said at least one bracket member is defined by a mounting bracket with a plurality of fingers which are configured to grip the ring member and support the engine of the second type;
   a pair of boot members disposed on each side of each of the T-square braces of said engine of said second type such that the T-square brace member of the engine of the second type is sandwiched between said pair of boot members, said pair of boot members being attached to each said mounting bracket, wherein said pair of boot members are constructed of a material having vibration and sound dampening properties;
   wherein the skeletal framework is configured for installation to said aircraft to retrofit said engine of said second type to said aircraft.

2. The retrofit adapter of claim 1, wherein the one or more bracket members includes a right bracket assembly and a left bracket assembly which attach to the skeletal framework, and are configured to support the engine of the second type and provide a secure fitment, thereby dampening movement and vibration during use.

3. The retrofit adapter of claim 2, wherein the one or more bracket members includes a top bracket assembly, which attaches to the skeletal framework and is configured to support the engine of the second type.

4. The retrofit adapter of claim 1, wherein the one or more bracket members are TIG welded onto the ring member.

5. The retrofit adapter of claim 1, wherein the skeletal framework is configured to support various components of the aircraft including the fuel lines, control system, and electronics and said retrofit adapter is further configured for retrofitting electrical, control, and fuel line connections of the aircraft and mating the engine of the second type to the aircraft.

6. The retrofit adapter of claim 1, wherein the one or more bracket members includes brackets of different sizes attached together and configured to support the weight of an aircraft engine.

7. In an aircraft having an engine of a first type and wherein said aircraft is not adapted for an engine of a second type, said engine of said second type having at least one integral T-square brace defining a mounting point, a A-system for retrofitting an aircraft engine of said second type to said aircraft, the system comprising:
   a circular member having a diametrical surface to receive said engine of said second type;
   a plurality of longitudinal members each having a first end and a second end, wherein said circular member and said plurality of longitudinal members are further adapted to facilitate retrofitting electrical, control, and fuel line connections of said aircraft to said engine of said second type;
   at least one attachment member adapted to attach the first ends of said plurality of longitudinal members in a circumferentially spaced apart manner to the diametrical surface such that the second ends extend transversely from the circular member in a first direction, wherein said at least one attachment member is defined by a mounting bracket for attaching the longitudinal members to the circular member wherein said at least one mounting bracket is configured to grip the ring member, wherein said at least one bracket member is defined by a mounting bracket with a plurality of fingers which are configured to grip the circular member and support the engine of the second type;
   a pair of boot members disposed on each side of each of the T-square braces of said engine of said second type such that the T-square brace member of the engine of the second type is sandwiched between said pair of boot members, said pair of boot members being attached to each said mounting bracket, wherein said pair of boot members are constructed of a material having vibration and sound dampening properties;
   at least one further attachment member adapted to attach the second ends of said plurality of longitudinal members to an inner portion of said aircraft, wherein shape and size of the inner portion of the said aircraft is only adapted to receive said engine of said first type; and
   at least one attachment member adapted to attach a rear end of the aircraft engine of the second type to the diametrical surface of the circular member such that a front end of the engine of the second type extends transversely from the diametrical surface opposite the first direction such that the engine of the second type is mounted to the aircraft suitable for approved flight.

8. In an aircraft having an engine of a first type and wherein said aircraft is not adapted for an engine of a second type, said engine of said second type having a plurality of integral T-square braces circumferentially spaced on the engine of the second type, a method for retrofitting said engine of said second type into said aircraft, said method comprising:

provided a skeletal framework including multiple tubular members configured to support said engine of said second type, wherein said skeletal framework includes a circular member having a diametrical surface to receive said engine of said second type and a plurality of longitudinal members each having a first end and a second end, wherein said circular member and said plurality of longitudinal members are further adapted to facilitate retrofitting electrical, control, and fuel line connections of said aircraft to said engine of said second type, wherein the skeletal framework is configured for installation to a second said aircraft to retrofit the engine of the second type to said aircraft;

providing one or more rear stiffeners attached to a rear end of the skeletal framework;

providing one or more forward stiffeners attached to the front end of the skeletal framework and to the fuselage of the aircraft;

attaching the first ends of said plurality of longitudinal members in a circumferentially spaced apart manner to the diametrical surface such that the second ends extend transversely from the circular member in a first direction, wherein said at least one attachment member is defined by a mounting bracket for attaching the longitudinal members to the circular member wherein said at least one mounting bracket is configured to grip the ring member, wherein said at least one bracket member is defined by a mounting bracket with a plurality of fingers which are configured to grip the circular member and support the engine of the second type;

attaching a pair of boot members on each side of each of the T-square braces of said engine of said second type, said pair of boot members further being attached to each said mounting bracket, wherein said pair of boot members are constructed of a material having vibration and sound dampening properties;

attaching the second ends of said plurality of longitudinal members to an inner portion of said aircraft; and attaching a rear end of the engine of the second type to the diametrical surface of the circular member such that a front end of the aircraft engine extends transversely from the diametrical surface opposite the first direction such that the engine of the second type is mounted to the aircraft suitable for approved flight.

* * * * *